US010972256B2

United States Patent
Deng (10) Patent No.: US 10,972,256 B2
(45) Date of Patent: Apr. 6, 2021

(54) ARCHITECTURAL SECURE SYSTEM FOR DIGITAL FILE IN CYBERSPACE

(71) Applicant: Ante Deng, Winston-Salem, NC (US)

(72) Inventor: Ante Deng, Winston-Salem, NC (US)

( * ) Notice: Subject to any disclaimer, the term of this patent is extended or adjusted under 35 U.S.C. 154(b) by 0 days.

(21) Appl. No.: 16/516,010

(22) Filed: Jul. 18, 2019

(65) Prior Publication Data

US 2019/0342070 A1 Nov. 7, 2019

(51) Int. Cl.
*H04L 9/06* (2006.01)
*H04L 9/08* (2006.01)
*G06F 21/62* (2013.01)
*G06F 21/60* (2013.01)
*G06F 16/18* (2019.01)

(52) U.S. Cl.
CPC .......... *H04L 9/065* (2013.01); *G06F 16/1858* (2019.01); *G06F 21/602* (2013.01); *G06F 21/6218* (2013.01); *H04L 9/0631* (2013.01); *H04L 9/0869* (2013.01)

(58) Field of Classification Search
None
See application file for complete search history.

(56) References Cited

U.S. PATENT DOCUMENTS

| | | | | |
|---|---|---|---|---|
| 8,509,424 B2* | 8/2013 | Deng | .................... | H04L 9/0631 380/28 |
| 2010/0146303 A1* | 6/2010 | Kothari | .................... | G06F 21/10 713/193 |
| 2012/0072713 A1* | 3/2012 | Begum | ................. | H04L 9/0822 713/153 |
| 2012/0221854 A1* | 8/2012 | Orsini | ................... | H04L 9/3226 713/167 |
| 2012/0224687 A1* | 9/2012 | Gueron | ................. | H04L 9/0631 380/28 |
| 2014/0355754 A1* | 12/2014 | Leung | .................... | H04L 9/065 380/28 |

* cited by examiner

*Primary Examiner* — Kaveh Abrishamkar (57) ABSTRACT

The ART-CRYPTO secure architectural system, designed for cyber security is always to keep the digital file/data encrypted, except for the processing period. The system's crypto engine is composed of fast key-changing apparatus (FKCA) array, which is an AES (Advanced Encryption Standard) cipher, which uses a key stream to achieve a file encryption/decryption, wherein the key stream prevents side channel attack and there is no key management. The system's identification and authorization management (IAM) distributed sub-system prevents ID fraud, malware, ransomware, spammer, and DDoS attacks. A data base (DB) with a special file structure (SFS) authorizes that a user accessing encrypted files according to user file attributes and its identification verification, prevents lowing the system's Cryptography level or having a back door design, which increases the possibility of breaching. The secure architectural system also solves the dilemma of privacy and security.

19 Claims, 10 Drawing Sheets

ARCHITECTURAL SECURE SYSTEM FOR DIGITAL FILE IN CYBERSPACE

CROSS-REFERENCE TO RELATED PATENT APPLICATIONS

The application is a continuation of U.S. patent application Ser. No. 12/618,771 of the title "FAST KEY-CHANGING HARDWARE APPARATUS FOR AES BLOCK CIPHER" filed on Nov. 15, 2009, and is issued as U.S. Pat. No. 8,509,424 on Aug. 13, 2013, which is incorporated herein by reference in its entirety.

REFERENCES CITED [REFERENCE BY]

Related U.S. Patent Documents

| | | |
|---|---|---|
| 8,509,424 B2 | August 2013 | Deng |

U.S. PATENT DOCUMENTS

| | | |
|---|---|---|
| 9,710,626 B2 | July 2017 | Bhushan et al. |
| 7,769,165 B2 | August 2010 | Jakubowski et al. |
| 10,033,702 | July 2018 | Ford, et al. |
| 9,843,624 | December 2017 | Taaghol, et al. |
| 9,455,955 | September 2016 | Fetik |
| 7,630,986 | December 2009 | Herz, et al. |
| 10,176,095 | January 2019 | Ferguson, et al. |
| 2003/0202658 A1 | October 2003 | Verbauwhede |
| 2004/0202317 A1 | October 2004 | Demjanenko et al. |
| 2005/0213756 A1 | September 2005 | Hubert |
| 2009/0125997 A1 | May 2009 | Cook |

OTHER REFERENCES

Jong J. Buchholz, "MATLAB Implementation of the Advanced Encryption Standard", http://buchholz.hs-bremen.de, Dec. 19, 2001. cited by other.
Behrouz A. Forouzan, "Cryptography and Network Security", pp 207-212, 2008. cited by other. Deng ANTE, "Flenible ASIC Design using the Block Data Flow Paradign (BDFP)", NCSU, 2002. cited by other.

FIELD OF THE INVENTION

The invented architectural system and methods relate to digital data file security through cyberspace, whether it is in a static state or a mobile mode.

BACKGROUND

The digital information security in cyberspace used to be supported mainly by software-oriented tools. Hackers also use the same method to neutralize the security and is successful most of the time. It seems that there is no good solution for cybersecurity up to this moment.

Cryptography is a highly effective method for securing digital data files. Yet, most of the encryption/decryption (ED) systems use a single key to encrypt/decrypt one data file or the whole system. It allows hackers to use methods like differential power analysis (DPA), powerful brute force computing such as quantum computing, to obtain the encryption key and compromise the security of digital data files. Above all, the key management for the cryptosystem is complicated and costly.

The software cryptography process consumes a lot of central processing unit's (CPU) computing power. Therefore, it brings down the computing performance.

We all know traditionally the system administrator has the power to access all the data files in the system due to his responsibility. Just for this reason, it is rather easy for a system administrator to steal top classified information if the system administrator is not trustworthy. It is also difficult to prevent an ex-employee from stealing classified files when he/she leaves the company.

It seems that the fight between lowing the cryptography level for the Justice Department who desires to monitor criminal activities and the protection personal privacy has been going on forever. This issue has been brought to the Congress and discussed without a good solution.

Sometimes, it is difficult for a traditional computing system to find the initiator behind an executing program. Knowing the program initiator is extremely important to prevent fraud, malware, ransomware, spammer, and DDoS attack.

The Now-a-day cybersecurity system needs to be set with the security parameters all the time to accommodate new customers. There is not a set-and-forget system on the market. Besides, it is rather easy for information technology person to make mistakes and give hiker opportunities.

According to the digital data security issues mentioned above, the newly invented security system, ART-CRYPTO secure architectural system is invented.

BRIEF SUMMARY

A cyberspace security system where its digital files are always encrypted except during the processing period, using the invented ART-CRYPTO secure architectural system is invented. The ART-CRYPTO secure architectural system comprises user interface (UI), and identity and authorization management (IAM) module, a database (DB) with a special File structure (SFS), a cipher engine (CE) module which comprises of a pseudo-random number generator (PNG) module, a clock speed controller module, and an encryption/decryption (ED) module, an operating system with a special scheduler (OSS), an isolated random access memory (IRAM) where its area is isolated from other user or program when a file is being processed, and an application programming module (App) where its computing resource is a heterogeneous system which contains "multiple" general-purpose processors, special-purpose processors, and different kinds of accelerators. The concept of using architectural security that keeps the digital data file encrypted all the time prevents software-oriented hacking. If a hacker steals an encrypted file, he needs the invented ART-CRYPTO secure architectural system to open it. If a rival obtains a device that has the invented ART-CRYPTO secure architectural system on it, he needs the user's identification (ID) information to decrypt the file. If a hacker uses a brute force method such as quantum computing to decrypt an encrypted file, the file will be destroyed automatically.

According to the specification of the invented ART-CRYPTO secure architectural system, the files are encrypted/decrypted in the CE module using the Fast Key-Changing Apparatus (FKCA) for AES cipher engine, which processes the files in blocks where a block is 128 bits, and each block of a file has its own encryption/decryption key, and the key in a different block is not repeated. The keystream of a file is generated by the PNG module and consumed/used up by the ED module immediately right after its generation within a cipher engine (CE) module, which the CE module is an application specific integrated circuit (ASIC).

According to the specification of the invented ART-CRYPTO secure architectural system, a encrypted files in the DB have a SFS format, which comprises an encrypted cipher text, a two codes (TC), a location map (LM), and a distribution list (DL). The first number of the TC in the SFS format file is the starting key of the keystream and the second number of the TC is the length of the file. The starting key (a random number) of the keystream is generated automatically by the first PNG in the PNG module when a file encryption request is raised. The keystream is generated by the second PNG in the PNG module using the starting key and the length of the file. The ED module uses the file length and the keystream to encrypt/decrypt a file. Since the encryption/decryption key is a keystream, it is changing on-the-fly, it is difficult to use side-channel like differential power analysis to steal the encryption/decryption keys. The keystream makes the post-quantum key deciphering difficult. Besides, the keystream is generated and consumed within an ASIC, there is no key management or a storage that secures the key.

According to the specification of the invented ART-CRYPTO secure architectural system, a encrypted file accessing authorization is determined by whether the user's attributes of the file exists in the DL, and whether the user passes the user identification (ID) verification process, which happens in the SFS and the IAM module. The user does not need a password to access a digital data file. The file accessing authorization is managed by the file owner, his superior, or a superuser through the editing of the DL. The invented ART-CRYPTO secure architectural system is a set-and-forget system. The file authorization scheme limits the file accessing to base-on-need-to-know scope. The Department of Justice can use a court order to expose criminal activity, and there is no need to reduce the cryptography level or design a backdoor in the system.

According to the specification of the invented ART-CRYPTO secure architectural system, the secure architecture itself is embedded in all computing devices, systems, sensors, and network environments throughout the Internet. The IAM modules in every device form into a subsystem, where it verifies the user ID, updates the user ID, disseminates the user ID to every device wherever the user digital data file exists. According to the specification of the invented ART-CRYPTO secure architectural system, the IAM module is designed to store user ID, where the user ID can be updated, erased, but not to be retrieved from the IAM module. Therefore, the IAM module in every device through the Internet is a distributed IAM subsystem where all users in the cyberspace are related through their files. In other words, the device acknowledges who is accessing the file. Thus, prevents fraud, malware, ransomware, spammer, and DDoS attack.

According to the specification of the invented ART-CRYPTO secure architecture, the user ID comprises user's biometrics, device hardware address, network domain name, routing addresses, geolocation information, and a Special Variable (SV). The SV is generated by an SV device and updates the user ID each time a user login onto a computing device.

According to the description of the specifications of the invented ART-CRYPTO secure architectural system, the system architecture only allows authorized user, whose user ID is matched with what was previously stored in the IAM module and whose attributes of the file exists in the DL, to access a encrypted file. The files in this system are always encrypted either at rest or in mobile, except during its processing period.

According to the description of the specifications of the invented ART-CRYPTO secure architectural system, the IAM module has an Artificial Intelligence (AI) unit, which is designed to process a user's interactive biometric ID data verification while the user ID is not fully matched with the stored original user ID, or the IAM module suspects that it is not a real user using a computing device.

According to the description of the specifications of the invented ART-CRYPTO secure architectural system, the plaintext of a file is processed in an Isolated Random-Access Memory (IRAM), which is assigned by the OSS, where only the authorized user or program can access to it. The IRAM is reset back to zero right after the file is being processed According to the description of the specifications of the invented ART-CRYPTO secure architectural system, a plaintext of a file is processed parallelly according to the data computing structure. The architecture uses a heterogeneous computing system, which is composed of multiple and different processors, to process the plaintext file. The data computing structure is analyzed by the Operating System Scheduler (OSS). The plaintext, after being processed by the App module, will be encrypted, attached with the TC, the LM, the DL, and then sent back to the DB.

According to the description of the specifications of the invented ART-CRYPTO secure architectural system, the OSS module coordinates the UI, the IAM module, the DB, the CE module, the IRAM, and the App module, to operate the user ID verification process, the file encryption/decryption process, the analyzing of the file data computing structure, the designating of the IRAM and the computing resource, where the computing resource is a heterogeneous processor system, and the plaintext execution. The OSS module analyzes the data computational algorithm and uses a proprietary customized design hardware configuration to assign its heterogeneous resource and the IRAM to proceed plaintext parallel processing.

According to the description of the specifications of the invented ART-CRYPTO secure architectural system, a encrypted file will be removed, transferred, or self-destroyed from the DB of a device or a computing system if the user on the device failed to access the encrypted file for certain times. This prevents hackers who use brute force methods such as quantum computers to neutralize the secure system.

According to the description of the specifications of the invented ART-CRYPTO secure architectural system, the auto-configuration unit in the ED module configures the number of processors in the ED scalable processor array according to the length of a file, that accommodates the large granularity data file processing. While the clock speed controller module in the CE module adjusts the clock speed between the inputting data rate of the ED module, the inputting keystream rate of the ED module, and the processing speed of the ED processor array, to fine-tune the small granularity data file processing.

BRIEF DESCRIPTION OF THE DRAWINGS

The drawings illustrate the key components, file processing procedures, and file structure of the invented ART-CRYPTO secure architectural system.

DETAILED DESCRIPTION

The ART-CRYPTO secure architectural system is to provide digital files (either audio, or video, or text, or sensor signals such as C4ISR signals) security (either static or mobile, either in the system or out of the system) through a CE, IAM distributed system, and its security architecture, which are embedded in computing devices, smartphones, systems, sensors, and network environments throughout the Internet.

According to the specifications of the ART-CRYPTO secure architectural system, a digital file is always encrypted (either static or mobile, either in the system or out of the system), except during the processing period in a computing device. During this processing time, the file is decrypted, in plaintext, and is sent to an isolated RAM where no other user or program could access to it, except those who are authorized. After the file is processed, the file will be automatically encrypted and sent back to a special file system in the Data Base and the isolated RAM will be reset back to zero. It is rather difficult for an implanted chip on the motherboard to investigate the vulnerabilities of the invented secure system.

According to the specifications of the invented ART-CRYPTO secure architectural system, the special file system has a special structure, which each file contains an encrypted ciphertext, the two codes, the file location map, and the file distribution list. The two codes includes the first, a pseudo-random number (PRN), which is the starting key of the keystream for the Encryption/Decryption process in the CE module, and the second is the keystream length; the file location map indicates all the locations where the file is located; the file distribution list contains all authorized users and their attributes. According to the specifications of the invented ART-CRYPTO secure architectural system, the file distribution list can only be modified by the file owner, his superior, or the superuser. Files in the invented ART-CRYPTO secure architectural system are controlled by the file distribution list so that a encrypted file will only be decrypted base on the need-to-know principle. There is no need to reduce the system cryptography level or set up a back door for special user, such as the FBI, to access a file. This file distribution list scheme limits the insider theft, such as Edward Snowden, that compromises a wide scope of system files.

According to the specifications of the invented ART-CRYPTO secure architectural system, the owner or user who accesses the file must be identified and authorized by the IAM module. The IAM module in every device is connected to the internet and form into a distributed IAM subsystem. The IAM module not only uses the user's real-time biometrics information to compare with the stored personal credential information but also uses a specially designed device, which generates a random variable, to identify the user's real identity. The user does not need to remember any password; the traditional password security mechanism does not exist in the invented ART-CRYPTO secure architectural system; and it must be a real person logging on a computing device, which has an IAM module built-in, to access an encrypted file, either locally or remotely.

According to the specification of the invented ART-CRYPTO secure architectural system, a file is divided into blocks. The block size is 128 bits/block and each block has its own encryption/decryption key. The keystream that provides keys for the encryption/decryption module is generated by a PNG hardware device, and the ED module and the PNG module are packaged in one ASIC. The keystream is consumed right after its generation within the ASIC. There is no need to store the keys or protect them in a safe area and manage it. According to these specifications of the invented secure architectural system, the system is both agile enough to accommodate the post-quantum computing scenario and is also side-channel eavesdropping (i.e., Differential Power Analysis, DPA) proofing.

The invented ART-CRYPTO secure architectural system comprises an UI, and IAM module, a DB with a SFS, a CE which composes of a PNG module and an ED module, an operation system with a special scheduler (OSS), an IRAM which its area is isolated when a file is being processed, and an App module where its computing resource contains multiple general-purpose processors, special-purpose processors, and accelerators.

According to the specification of the invented ART-CRYPTO secure architectural system, the UI is the first contact point where a user (either locally or remotely) raises a request to the local OSS and tires to access a file in the computing system or the device. The user must provide his/her newest personal credential identification, which is provided by the IAM module (either locally or remotely), to the UI module. This newest user identification data is updated and stored in the IAM module where the user logged on and stay on that specific computer/device. This newest user ID data will be compared with the original user ID data, which is stored in the local IAM module. If the comparison is not matched or the local IAM module is not sure about the accessing file request is raised actually by a real person, the UI will be informed and asked to do a further interactive biometrics ID data matching. Since the UI and the IAM module help the ART-CRYPTO secure architectural system to identify that it is a real person who logs on to a computing device and tries to access a file, it prevents Distributed-Denial-of-Service (DDoS) attack.

According to the specification of the ART-CRYPTO secure architectural system, the system includes the IAM module. The IAM module cooperates with the OSS and the file distribution list, which is in the DB and authorizes a user to access a file under the condition that the user ID is matched with the original user ID that is stored in the IAM module.

The IAM module is embedded in every device (PC, workstation, server, IoT sensor, pad, notebook, HPC, PDA, a device like Google gargle, smartphone, smartwatch, etc.)

and it contains user ID data. The user ID data in the IAM module includes user biometrics, device hardware address, network domain name, routing addresses, geolocation information, etc.; and above all, it contains a special variable (SV).

According to the specification of the ART-CRYPTO secure architectural system, the SV is provided by a device, which generates a random number. And this random number is to be updated into user ID data. The IAM modules in each device are connected through the internet and communicate with each other. Once the SV device is plugged into a user computing device and connected to the internet, it will update the newest SV to the user ID in the local IAM module and register the location of the user; this newest user ID, which includes the new location of the user, will be sent to all the IAM modules through the internet where the IAM module contains the user ID. The user ID, which is in the IAM modules, accompanies the user attributes of a file, which is in the DL of a file. The SV device is activated by the user's biometrics. The SV that is generated by a device is, for example, an image parameter; where the parameter is calculated by averaging the gray level number of the pixels of a photo, stock market value, temperature, friction, pressure, humility, . . . etc. The SV is changed at the user's desire, serves as another layer of security, and makes it more difficult for hackers to steal the user's ID.

The biometrics of a user is his fingerprints, palm prints, facial image (with different frequency images, or a facial smiling stream), iris scan, DNA, brain wave pattern, voice analysis, etc. The IAM module includes an Artificial Intelligence (AI) recognition unit, which helps the system to identify an individual user's body, soul, and spiritual level of data. The AI unit in the IAM module which cooperates with the OSS module in the computing device is an interactive device, which requests the user or user's program to respond to a specific demand that the AI unit raises in real-time when the user ID matching process is not satisfied. The demanded algorithm is decided by the AI unit in the IAM module.

According to the specification of the ART-CRYPTO secure architectural system, the IAM modules are distributed in every device and are centrally controlled. The central controller oversees the communications between IAM modules. The controller can plug into any IAM module node to operate its function.

According to the specification of the ART-CRYPTO secure architectural system, the IAM modules automatically generate a network map (NM), which uses each user device's routing address, domain name, device hardware address, and the user's login identity when user login on a computing device. The user device can move around within the Internet, where its authorized files follow him in the nearest cloud, and his NM is changed accordingly. When the NM is established, the user ID would be verified, and his authorization to encrypted data files could be confirmed.

According to the specification of the ART-CRYPTO secure architectural system, the IAM module is a hardware device that is packaged in an ASIC, where it provides personal ID data storage, modifying, and updating. The data in the ASIC cannot be retrieved in any way.

According to the specification of the ART-CRYPTO secure architectural system, a special file structure in the file system, which is in the database (DB), contains a file distribution list, which is to provide authorized user to access the file according to his attributes (read, write, edit, copy, print, etc.). The distribution list can only be modified by the file owner, his superior, and the super user. The special file structure includes two code numbers, which are used by the CE to encrypt/decrypt the file. The first code number is the starting key (seed) of the keystream, which is generated from the first pseudo number generator in the pseudo number generator module. The second number is the length of the key stream. The length of the keystream is also the number of blocks of a file, which is calculated by dividing the file length by 128. According to the specification of the ART-CRYPTO secure architectural system, the special file structure includes a location map list, which describes all the locations where the file exists. The location map facilitates the management of the file.

According to the specification of the ART-CRYPTO secure architectural system, the communication between the OSS and the IAM module is a point to point communication where it prevents the software-oriented manipulation. The OSS waits specifically for the verification signal from the IAM module once a user ID verification request is raised. If the verification signal from the IAM module does not come (either a yes or a no signal) for a certain time or times and the device is connected to the Internet, the system is designed to have the file to be removed from the device or the computing system, and transferred to another secured system. If the system is not connected to the Internet, the file will be self-destroyed automatically in the existing device database. This design is to prevent the file from falling into a rival's hand and being compromised.

According to the specification of the ART-CRYPTO secure architectural system, the system is designed to use the DL, the OSS module, and the IAM module to determine who has the authority to access to a encrypted file. Only the owner of the file or authorized personnel has the authority to modify the context of the DL, such as the user's attributes of the file. It is not necessary to reduce the system cryptography level or using a backdoor, or a master key to felicitate a special user, such as the FBI, to access to a encrypted files. This secure design solves the issue that the Justice Department could not investigate criminal activities due to file encryption. The design also limits an administrator trying to access encrypted files beyond his authority. The design prevents the internal theft or a person who leaves his job and later tries to access his/her encrypted files or people such as Edward Snowden from compromising secret files. The design also limits hackers trying to modify the operating system (OS) or updating a different version of OS. Virus, Malware, ransomware deems to be terminated. There is no need for users to remember passwords since the distribution list and the IAM module verification process decide who can access a encrypted files.

According to the specification of the invented ART-CRYPTO secure architectural system, the CE is a hardware device, which is composed of an ED module, where the processor arrays in the ED module are Fast Key-Changing Apparatus (FKCA) for AES cipher engine, and a hardware PNG module, which has two PNGs, and a clock speed controller. One of the PNGs in the PNG module is to generate the cipher keystream without human interference/intervene and the other one is to generate a starting key for the keystream. The starting key of the file encryption keystream is automatically given by the first PNG whenever the file is to be encrypted, and this starting key is sent into the first code of the TC as well as the second PNG. This first code of the TC is also used as the starting key of the decryption keystream in the file decryption process. These PNGs which generate the keystream for the ED module is packaged in the CE ASIC. It is rather difficult for a hacker to investigate the keystream since the keystream is generated and consumed immediately within a hardware ASIC. The owner of a file does not worry the key management or password management since the file encryption/decryption process is automatically operated within an ASIC without any external human intervention. The owner of the file has the authority to re-encrypt the file easily, either automatically or manually, with another different key stream which is generated automatically by the PNG module.

According to the specification of the invented ART-CRYPTO secure architectural system, the CE module is hardware and is separated from the central processing unit (CPU), it will not bring down the performance of the CPU. The FKCA changes block key on-the-fly and is packaged in an ASIC. It is rather difficult to use side-channel like differential power analysis to steal the keystream. According to the specification of the invented ART-CRYPTO secure architectural system, the file is designed to self-destroyed after a local user fails to access the file, for example, three times, in an isolated environment (where the system is not connected to the internet). It is difficult for a quantum computer to analyze and catch up with the on-the-fly FKCA keystream.

According to the specification of the ART-CRYPTO secure architectural system, the CE module has two special characteristics concerning the data file processing speed. The first characteristic is that the CE module is scalable and accommodates to large granularity data processing by using an auto-configuration unit in the ED module. The Auto Configuration unit configures the number of FKCAs in the ED processor array according to the length of the file. The ED processor array is built in Block Data Flow Architecture, which is a parallel pipeline hardware architecture. The other characteristic of the CE module is to make a fine adjustment for data processing speed by using a clock speed controller in the CE module and to adjust the speed ratio between two clocks. The clock speed controller has a feedback signal input, which is generated from the ED module and is used to optimize the speed ratio between the two clocks. These two clocks are input into the PNG module and the ED module. The PNG module is a hardware and is designed to have five inputs, one keystream and one keystream seed outputs.

The design of pairing the PNG and the ED module creates a hardware device that does not use outside memory to store the keystream nor use an extra outside key management. The keystream that generates from the PNG module is consumed in the ASIC on-the-fly by the ED module immediately. The keystream is never exposed outside of the ASIC. There is no need to manage the keystream. There is no way for hackers to use side-channel or other methods to steal the keystream. According to the specification of the invented ART-CRYPTO secure architectural system, the design of the PNG module, the keystream, and the ED module architecture are different from those traditional secure systems, which must use many ways to secure key and password.

According to the specification of the invented ART-CRYPTO secure architectural system, the system has an IRAM architecture, which is designated by the OSS as an isolated memory area for plaintext file processing. This area restricts all other users to access it, except those authorized users, while a plaintext file is being processed. This restriction will be expired when the data is processed, sent back to DB, and the area is reset back to zero. The App module processed file will be encrypted, attached with a DL, a LM, and a TC.

The OS Scheduler (OSS) module in the ART-CRYPTO secure architectural system coordinates between the UI, IAM module, DB, CE, isolated RAM area, and App module. The OSS module receives a request from a user through the UI trying to access an encrypted file, the OSS module then sends a signal to the DB to search for the user's file attribute in the DL. If the user's file attribute is verified, the OSS module will send another signal to the IAM module asking for user ID verification. If the verification process fails, the OSS module will inform the user through the UI and reject the request. If the user ID matches the original stored user ID which is in the IAM module, the OSS module will schedule the user's request and execute its command.

According to the specification of the invented ART-CRYPTO secure architectural system, the OSS module designates an area of the IRAM for processing the plaintext after the user ID is verified. An application program is selected by the OSS module according to the data file computing structure. The data computing structure, for example, is like an image processing, video processing, a voice processing, a text processing, or Machine Learning, etc. The OSS module analyzes the data computing structure and assigns the system resource (such as how many processor units and what kind of processor, CPU, GPU, FPGA, or ASIC, to be used) to the application program module to do data-parallel processing. After the plaintext data is processed, the result data will be sent back to the CE module to be encrypted, the IRAM area will be reset back to zeros, and the encrypted file will be stored back to the DB module.

Figure 1:
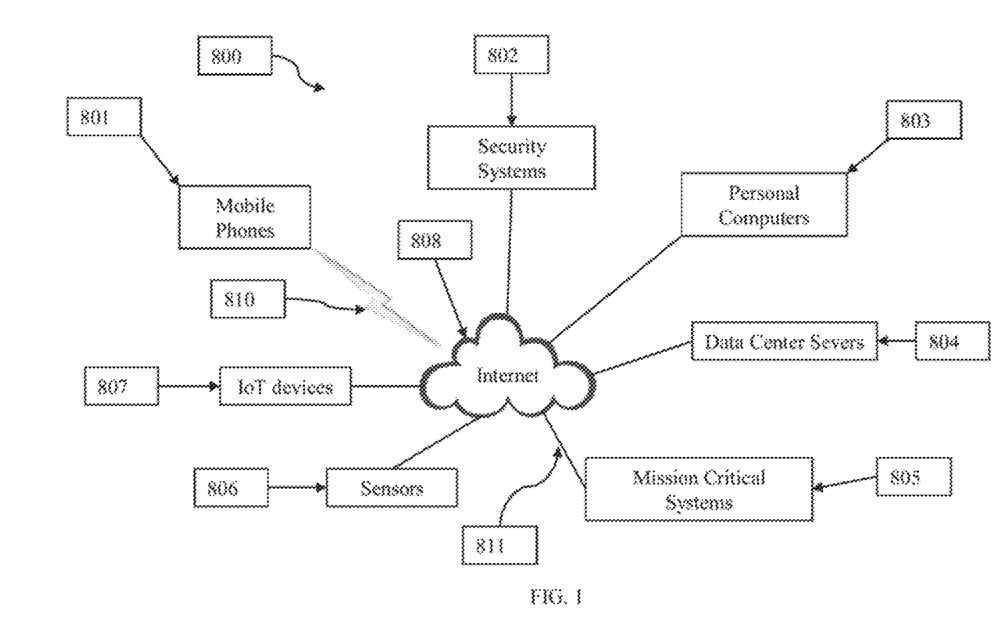
FIG. 1 shows all the devices, subsystems, which contain the invented ART-CRYPTO secure architectural system, connect and communicate with each other through wired or wireless internet.

The detailed description of the figures is followed:

FIG. 1 800 is the internet system 808, either through wire 811 or wireless 810, where the invented ART-CRYPTO secure architectural system 100 is embedded in every device and the IAM module 102 in the ART-CRYPTO secure architectural system 100 communicates with each other through the internet 808. The devices, which are not limited to as illustrated, which are connected to the internet system 808, are mobile phones 801, security systems 802, personal computers 803, data center servers 804, mission-critical systems 805, sensors 806, and IoT devices 807.

Figure 2:
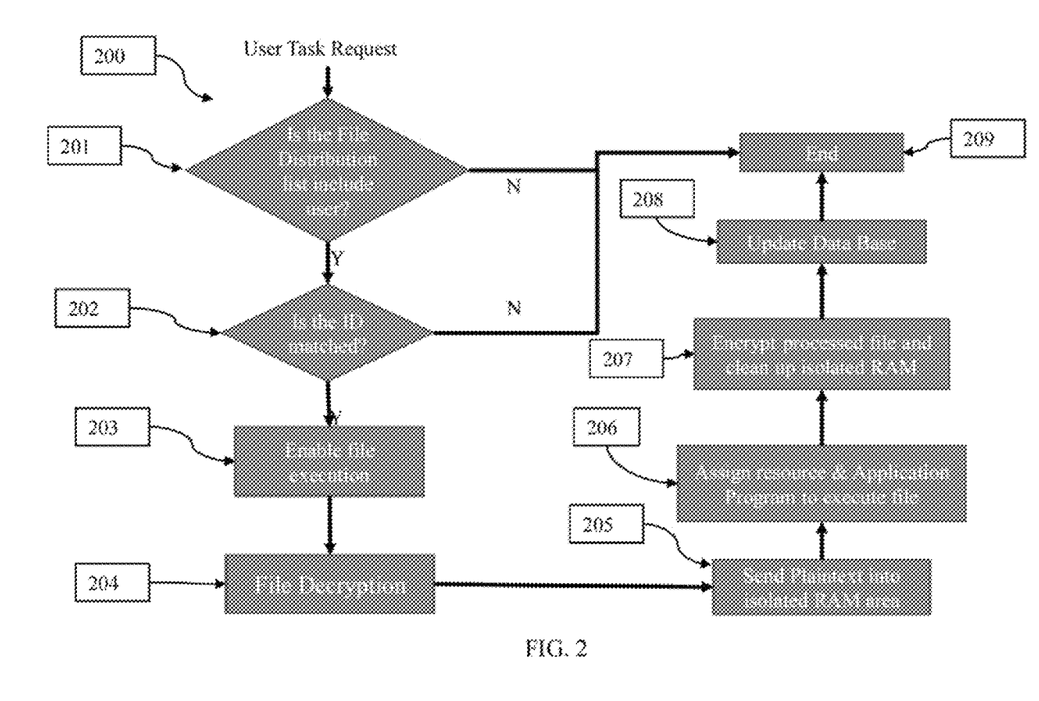
FIG. 2 shows the key components, data flow, and the control signals between them, of the invented ART-CRYPTO secure architectural system.

FIG. 2 is a block diagram 200 that describes how a request (accessing an encrypted file) from the user is processed. According to the specification of the invented ART-CRYPTO secure architectural system 100, the system will search in the file DL 904 for the attributes of the user, according to the user ID, when a user raises a request accessing the file 201. If the user file attribute is not included in the file DL 904, the request will be rejected, and the process will be ended 209. If the user file attribute is included in the file DL 904, the system will ask the user for further user ID verification 202. If the user ID verification fails, the user request will be ended 209. If the user ID is matched with the stored user ID in the IAM module 102, the system will enable the user's request and execute 203 the encrypted file. The encrypted file will be decrypted 204 first, then the plaintext will be sent 205 to an isolated area in the RAM module 106. After the RAM module 106 receives the plaintext file, the RAM module 106 will have the OSS module 103 to assign a processing resources and execute the application program 206. After the application program finishes its execution, the result data will be encrypted 207 and the isolated RAM area 106 will be reset to zero. The result encrypted file will then be sent 208 back to the DB module 104 and updating the stored data. The user's request task will be ended 209 after the data is being updated.

Figure 3:
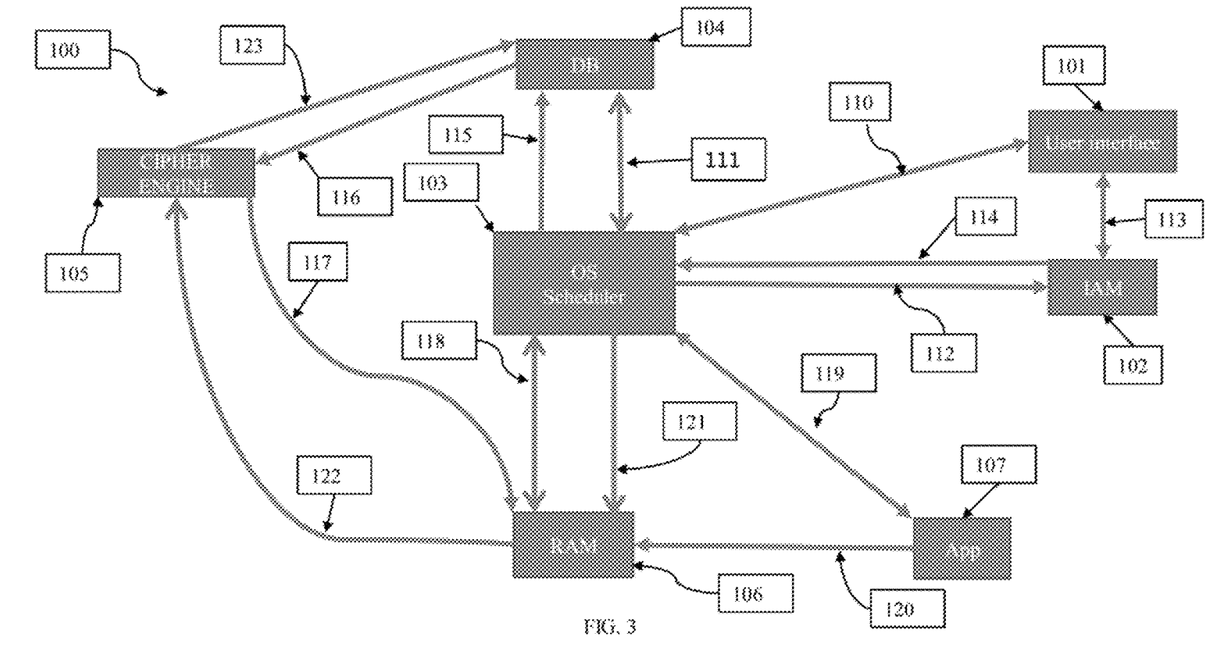
FIG. 3 shows the file processing procedures of the invented ART-CRYPTO secure architectural system.

FIG. 3 is the system block diagram 100 of the invented ART-CRYPTO secure architectural system. The key components of the system are UI module 101, IAM module 102, Operating OSS module 103, DB module 104, CE module 105, IRAM module 106, and App module 107.

UI module 101 is designed to receive task request from either local or remote user, temperately store user's ID, send the request signal of the user through 110 to the OSS module 103, send the user ID to the IAM module 102 through 113, wait for the verification result from the IAM module 102 where the original user ID was stored, and request the user IAM module where the user logged on for further ID verification in real-time if the Artificial Intelligent (AI) unit in the decision making logic (DML) 602 is not satisfied with the task requesting user's ID.

IAM module 102 is designed to do user identification, authorization, and management. During the ID verification process, the IAM module 102 receives the matching request signal from the OSS module through 112. The user who requests to access a encrypted file will provide his ID in the UI module 101 and is sent to IAM module 102 through 113. If the user ID is matched with the original user ID stored in the IAM module 102, then a match signal will be sent through 114 to the OSS module 103. If the AI unit in the IAM module 102 is not satisfied with the user ID during the matching process, a real-time interactive signal, which asks the user to send more biometric data for the further verification process, will be sent through 113 to the UI module 101.

During updating the user ID SV or updating/inputting a new user ID process, the IAM module 102 uses a composite line 113 as an interface to communicate with the remote IAM module, local SV device, local new user, and remote top IAM control module.

Figure 10:
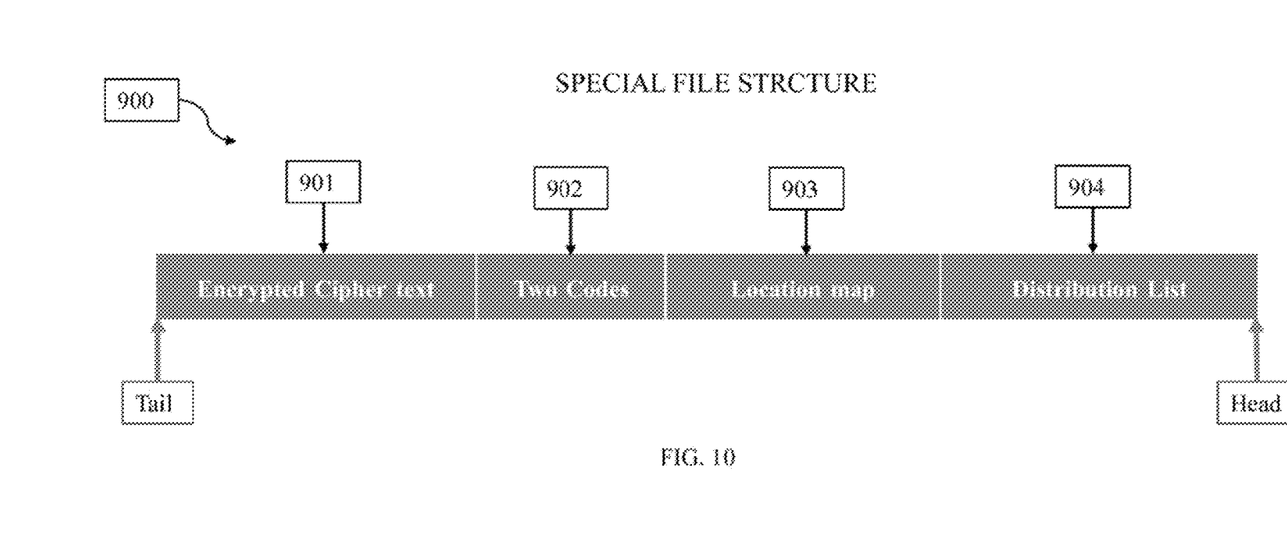
FIG. 10 shows the file structure of the invented ART-CRYPTO secure architectural system.

DB module 104 is designed to store encrypted files. According to the specification of the invented ART-CRYPTO secure architectural system, it has a special file structure 900, which includes a distribution list 904 for a encrypted file 901. The OSS module 103 will send a user ID through 111 to the DB module 104 when a user in the UI module 101 raises a request to access a encrypted file 901. After verifying the attributes of the user in the distribution list 904, the DB module 104 will send a signal to OSS module 103 through 111 requesting further user ID matching process. If the user ID matching process is successful, the OSS module 103 will execute the encrypted file 901 by sending a signal through 115 to the DB module 104. After receiving an enable file execution signal from the OSS module 103 through 115, the DB module 104 will send the encrypted file 901 to the CE module 105 through 116. When the plaintext of a file is being executed and re-encrypted, the CE module 105 will send it back to the DB module 104 through 123 for updating the encrypted file 901.

CE module 105 is designed to encrypt/decrypt files. According to the specification of the invented ART-CRYPTO secure architectural system, the CE module 105 will process a encrypted file 901 according to the two codes 902 in the special file structure 900 when it receives the encrypted file 901 from the DB module 104 through 116. The decrypted plaintext file will be sent through 117 to the IRAM module 106, where the area of the IRAM module 106 is designated by the OSS module 103. When the application program module 107 finishes its execution with the plaintext, the OSS module 103 will send the result data from the IRAM module 106 back to the CE module 105 through 122. The CE module 105 will then encrypt the result plaintext file, attach the two codes 902, the location map 903, the distribution list 904, and send it back to the DB module 104 through 123.

The IRAM module 106 is designed to temperately store the plaintext file that sent from the CE module 105 through 117 and is isolated from unauthorized user. After the IRAM module 106 finishes receiving the plaintext file from 117, it sends a request signal to the OSS module 103 through 118, asking the OSS module 103 to allocate and configure the processing resources (such as multiple CPUs, multiple accelerating processors, FPGAs, ASICs, and special memory architectures) according to the data computing structure of the plaintext file through 119. The Application module 107, which contains the allocated and configured processing resources, will execute the plaintext file in the IRAM module 106 through 120. After the plaintext file is processed, the IRAM module 106 will receive a store back signal from the OSS module 103 through 121 and send the result file back to the CE module 105 through 122.

According to the invented ART-CRYPTO secure architectural system, the Application programming module 107 is designed to contain different processing resources, which has different multiple CPUs, accelerating processors, FPGAs, ASICs, and special memory architectures. The configuration of the processing architecture is a proprietary data that is in a lookup table and is formed according to the data file computing structure. The Application module 107 receives designating and configuring signal from the OSS module 103 through 119 and executes the file in the IRAM module 106 through 120.

The OSS module 103 is designed as the central controller of the invented ART-CRYPTO secure architectural system on a device. It controls the user identification and authorization process, the file encryption and decryption process, and the file execution process. The OSS module 103 receives a request for accessing an encrypted file 901 signal from the UI module 101 through 110 and then sends a user ID through 111 to the DB module 104 to search for the file attributes of the user in the file DL 904. If the user file attribute is not in the file DL 904, then the OSS module 103 will send a reject signal to the UI module 101 through 110. If the user file attribute is in the file DL 904, the OSS module 103 will send a signal to the IAM module through 112 requesting a user ID verification process. If the user ID is matched with the original user ID stored in the IAM module 102, a matched signal will be sent from the IAM module 102 through 114 back to the OSS module 103. The OSS module 103 will then issue an enable signal through 115 to the DB module 104 and start the file decryption process.

According to the specification of the invented ART-CRYPTO secure architectural system, the OSS module 103 receives a starting file execution signal sent from IRAM module 106 through 118 when the IRAM module 106 receives the plaintext file. The OSS module 103 then configures a special memory architecture through 118 in the IRAM module 106 according to the proprietary lookup able table and designates different multiple CPU, GPU, FPGA, and ASIC in the heterogeneous APP module 107 through 119 for data-parallel processing. The OSS module 103 sends a file storing back signal through 121 to the IRAM module 106 when it receives the execution file finished signal from the APP module 107 through 119.

Figure 4:
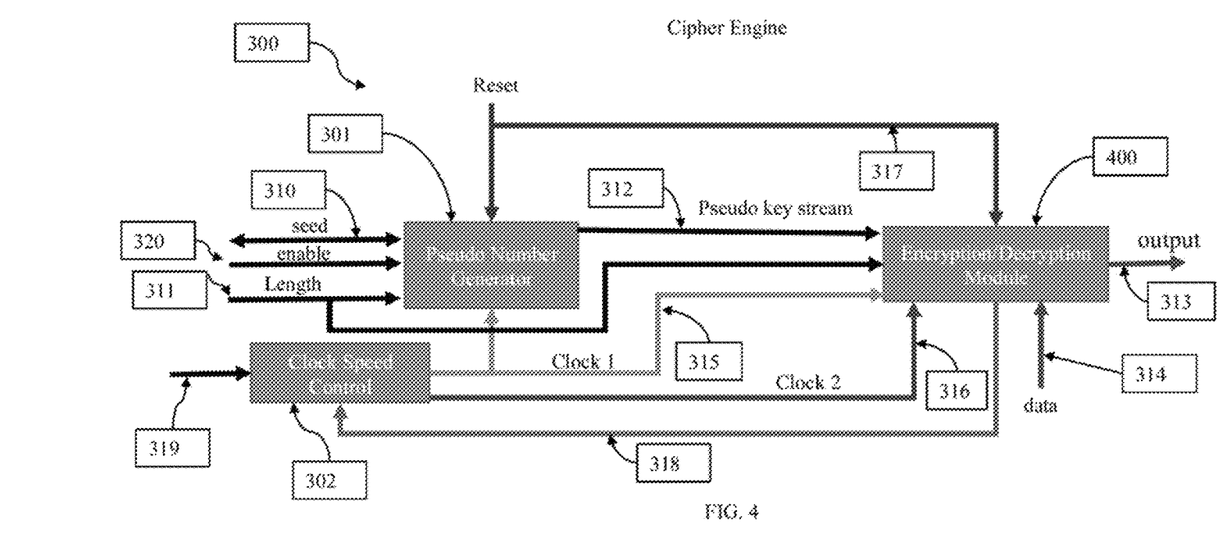
FIG. 4 shows the CE module of the invented ART-CRYPTO secure architectural system.

FIG. 4 illustrates the CE module 300 (in FIG. 3 was labeled as 105). It has three main components, the PNG module 301, the clock speed controller 302, and the ED module 400. The PNG module 301 has five inputs and two output ports. 310 is the seed signal and is a bidirectional input/output port. The seed 310 is the first key to the encryption/decryption keystream. It is an input port when the CE module 300 is used in a decryption process and is an output port when the CE module 300 is used in an encryption process. 320 is an enable input signal. It 320 triggers the first pseudo number generator 701 in the PNG module 301/700 to generate a random number. This random number provides the seed input 710 for the second pseudo number generator 702, and the first code of the TC 902 in the SFS 900.

According to the specification of the invented ART-CRYPTO secure architectural system, the Length signal 311 is a signal that is related to the length of the file. It 311 is input into both the PND module 301 and the ED module 400. The PND module 301 uses it 311 to generate a pseudo key stream 312 for the ED module 400. The ED module 400 uses it 311 to configure the encryption/decryption array 500 so that the array is scalable to accommodate the data processing throughput for the ED module 400. A reset signal 317 is input to both the PND module 301 as well as the ED module 400. Every time the CE module 300 finishes file encryption or decryption, the memory or FIFO in both the PND module 301 and the ED module 400 need to be cleared. The pseudo key stream 312 is generated from the PND module 301 and input into the ED module 400. Every key in the pseudo key stream 312 is used in the ED module 400 to encrypt/decrypt one block of a data file.

According to the specification of the invented ART-CRYPTO secure architectural system, there are two different speeds of clocks in the CE module 300. The Clock 1 315 is distributed into the PNG module 301 and the ED module 400. The Clock 2 316 is input only into the ED module 400. A feedback signal 318 is coming out from the ED module 400 and input into the clock speed controller 302. This feedback signal 318 is used in the clock speed controller 302 to adjust the speed ratio between the clock 1 315 and the clock 2 316. The system clock is 319 and is input into the Clock Speed Controller 302. The CE module 300 data input is 314 and is input into the ED module 400. The CE module 300 data output 313 is the output of the ED module 400. This data output 313/117 is sent to the IRAM module 106 when the CE module 300 is in the decryption process and is sent 313/123 to the DB module 104 when the CE module 300 is in the encryption process. The CE module 300 can process encryption as well as decryption simultaneously.

Figure 5:
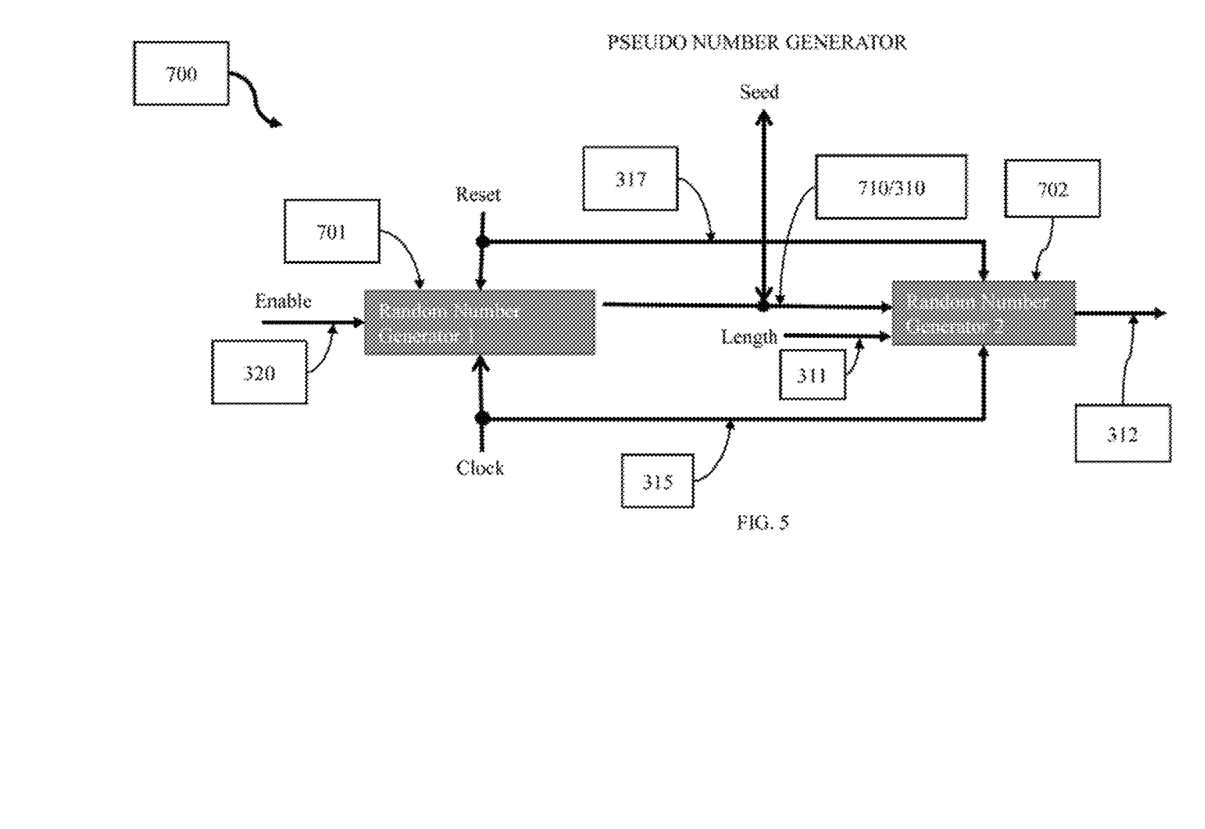
FIG. 5 shows the PNG set of the invented ART-CRYPTO secure architectural system.

FIG. 5 illustrates the PNG module 700 (labeled in FIG. 4 as 301). There are two PNGs 701, and 702. The reset signal 317 and the clock signal 315 distribute their signals into both PNGs. According to the specification of the invented ART-CRYPTO secure architectural system, an enable signal 320 is input into the PNG 1 module 701 and is enabled for one clock cycle whenever the CE module 105 is in encryption process. The PNG 1 module 701 generates a seed 710/310. The seed signal 710 is input into the PNG 2 module 702 and is used as the first key of the keystream. The seed signal 310 is sent out to the TC 902 as the first code in the SFS 900. According to the specification of the invented ART-CRYPTO secure architectural system, the Length signal 311 which is the length of the file, is sent into the PNG 2 702. The PNG 2 702 uses it 311 to generate the same length keystream. The output of the PNG 2 702 is 312, which is sent directly into the ED module 400 and consumed immediately.

Figure 6:
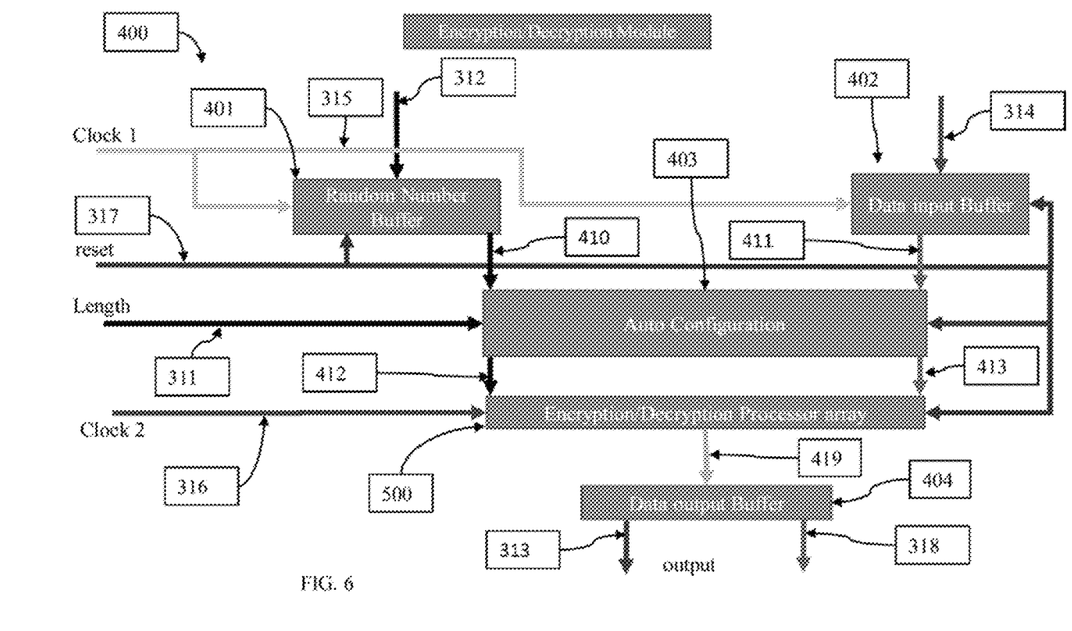
FIG. 6 shows the ED module of the invented ART-CRYPTO secure architectural system.

FIG. 6 illustrates the ED module 400. According to the specification of the invented ART-CRYPTO secure architectural system, the ED module 400 contains a Random Number Buffer 401, a Data input Buffer 402, an Auto-Configuration circuit 403, an ED Processor Array 500, and a Data output Buffer 404. The keystream is input into the Random Number Buffer 401 through 312 and the Random Number Buffer 401 is output to the Auto-Configuration circuit 403 through 410. The Clock 1 signal is fed into the Random Number Buffer 401 and the Data input Buffer 402 through 315, and its speed is faster than the Clock 2 316 signal. The Reset signal 317 is distributed into the Random Number Buffer 401, the Data input Buffer 402, the Auto-Configuration circuit 403, and the ED Processor Array 500. The data file is input into the Data input Buffer 402 through 314 and the Data input Buffer 402 is output to the Auto-Configuration circuit 403 through 411.

According to the specification of the invented ART-CRYPTO secure architectural system, the configuration of the Auto-Configuration circuit 403 is controlled by the Length signal 311, which is related to the length of the file. The longer the file length is the more processors in the ED processor Array 500 will be. The Auto-Configuration circuit 403 is like a demultiplexer that distributes the keystream as well as the data file, into the different processor in the ED Processor Array 500. The output of the Auto-Configuration circuit 403 is 412, which is the encryption/decryption keys, and 413, which is the blocks of the data file.

Figure 7:
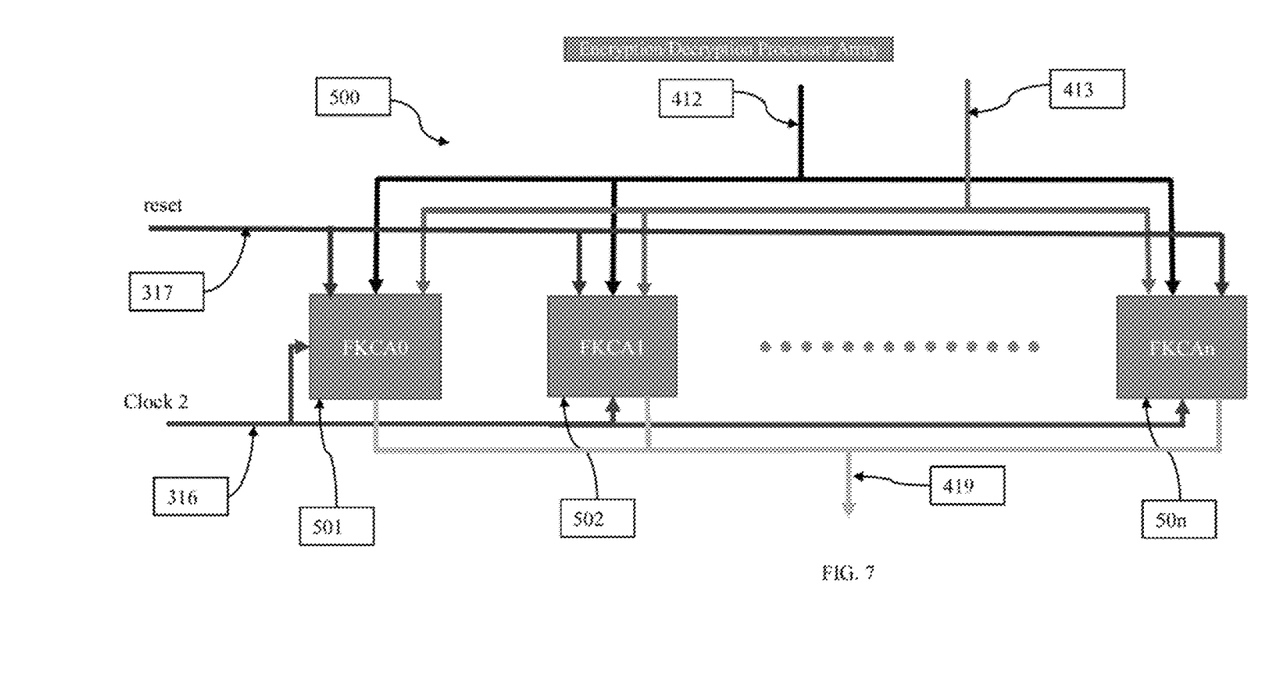
FIG. 7 shows the ED processor array of the invented ART-CRYPTO secure architectural system.

According to the specification of the invented ART-CRYPTO secure architectural system, as soon as the ED processors 501 to 50$n$ in the ED processor Array 500 receives its individual encryption/decryption key and the block of data, it starts its processing asynchronously. The output of the ED Processor Array 500 will be sent into the Data output Buffer 404 through 419. The Data output Buffer 404 is like a Multiplexer, which collects the processed block of data back into its original file sequence and outputs it through 313. According to the specification of the invented ART-CRYPTO secure architectural system, the other output 318 from the Data output Buffer 404 is a feedback signal, which is sent to the input of the clock speed controller 302 to adjust the speed ratio between Clock 1 315 signal and Clock 2 316 signal.

FIG. 7 illustrates the ED Processor Array 500. According to the specification of the invented ART-CRYPTO secure architectural system, there are "n" Fast Key Changing Apparatuses (FKCA) in this array. The number of "n" depends on the length of the file. The keystream input of the FKCA 501-50$n$ is 412, the data block input is 413, and their output is 419. The Reset signal 317 and the Clock 2 signal 316 are distributed into every FKCA 501-50$n$. The Reset signal 317 is to clear the memory in the FKCA 501-50$n$ every time the ED module 400 finishes a file task. The detailed characteristics and specifications of the ED Processor Array 500 were described in the U.S. Pat. No. 8,509,424 B2 and the "FLEXIBLE ASIC DESIGN USING THE BLOCK DATA FLOW PARADIGM (BDFP)" thesis, NCSU, 2002.

Figure 8:
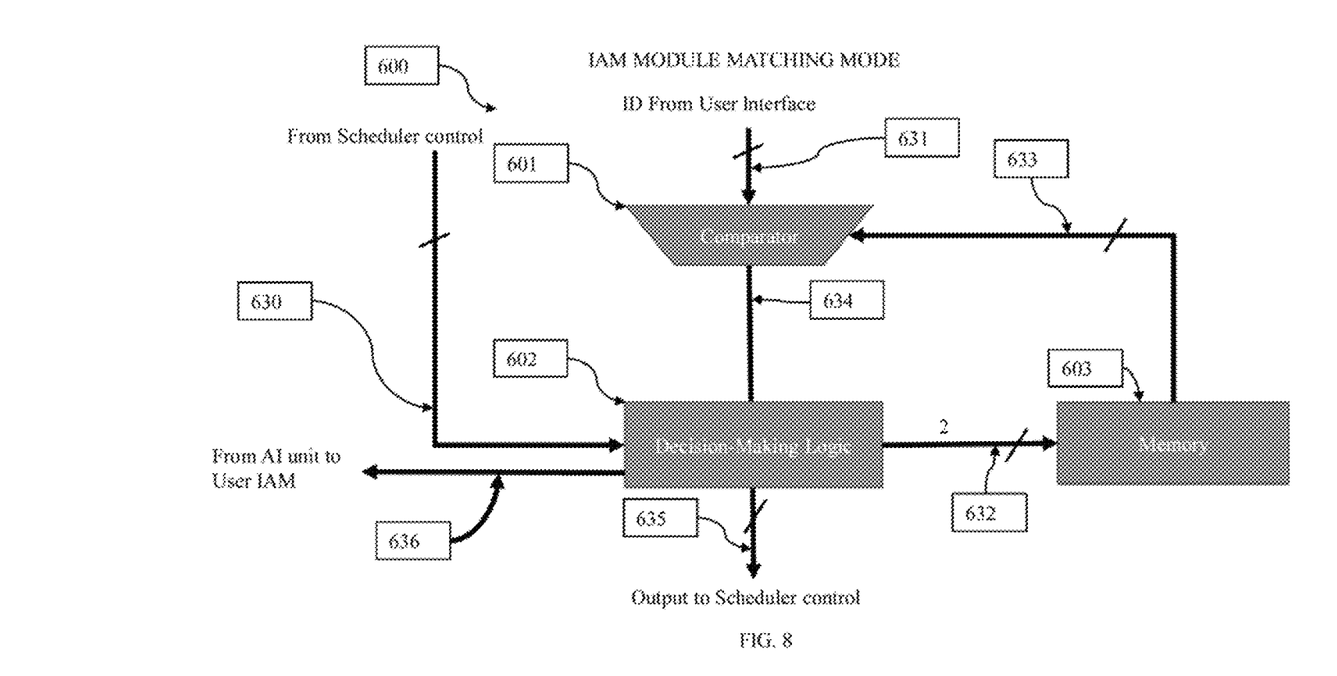
FIG. 8 shows the IAM module matching mode block diagram of the invented ART-CRYPTO secure architectural system.

FIG. 8 illustrates the IAM module 600 when it is in the user ID matching mode. There are three main components involve in this mode, the Comparator 601, the Decision-Making Logic 602, and the Memory 603. When a user raises a request 110 to access an encrypted file and his user ID is found in the distribution list 904, the OSS module 103 will send a request signal 112/630 to the Decision-Making Logic 602, asking for user ID matching process. The Decision-Making Logic 602 will send a signal 632 to the Memory 603 to locate the user ID. When the Memory 603 finds the user ID, it will retrieve the user ID and send it through 633 to the Comparator 601 to verify the user identity.

The Comparator 601 compares the user ID input 113/631, which is sent from the User Interface 101, with the retrieved user ID 633. The result of the Comparator 601 will be sent to the Decision-Making Logic 602 through 634. If there is a match/not-match during the user ID matching process, the Decision-Making Logic 602 will send a yes/no signal to the OSS module 103 through 635/114. If the input signal 634 of the Decision-Making Logic 602 is not fully matched, or there is a need to have more user ID verification, the AI unit in the Decision-Making Logic 602 will send a signal to the user logged-in IAM module 102 through 636/113 requesting the user to send an interactive biometric data, for example, a video clip of the user's smiling face, for further verification.

Figure 9:
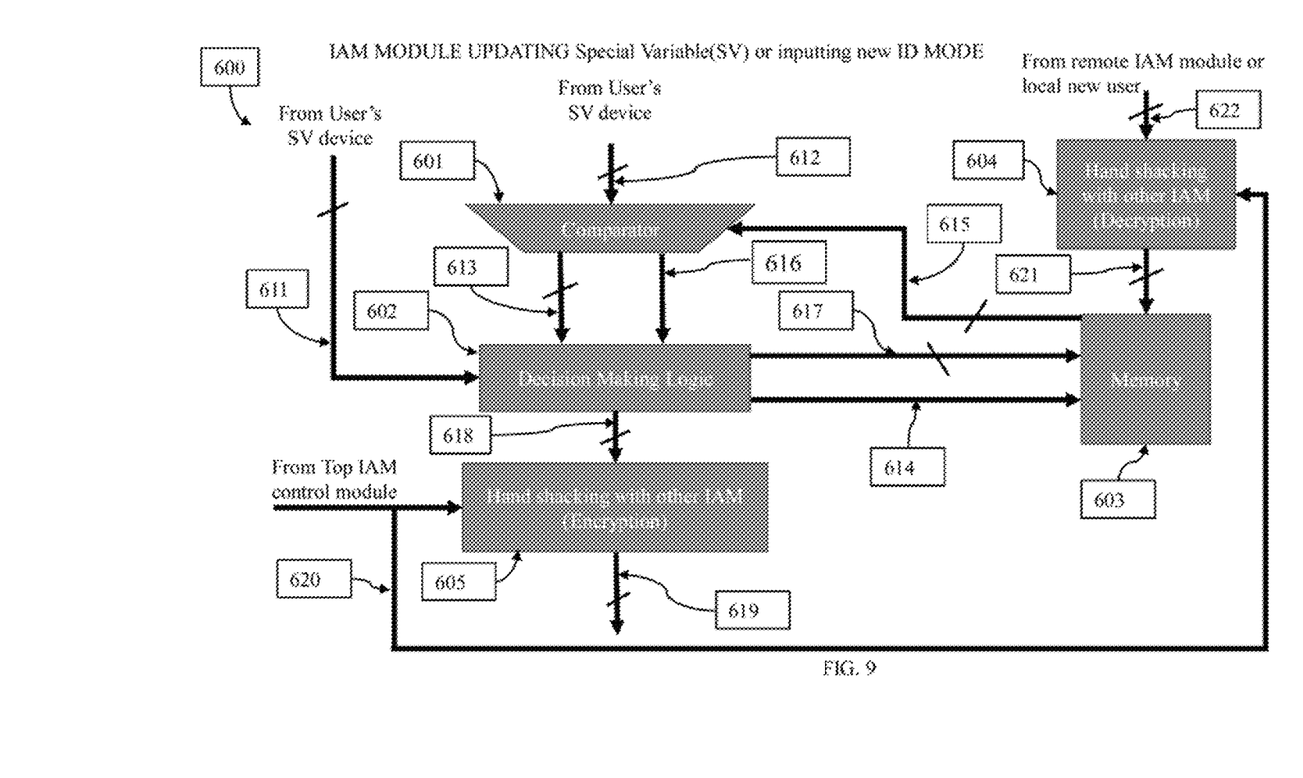
FIG. 9 shows the IAM module updating random variable and inputting the ID mode block diagram of the invented ART-CRYPTO secure architectural system.

FIG. 9 illustrates the IAM module 600 in the updating SV or inputting new user ID mode. According to the specification of the invented ART-CRYPTO secure architectural system, there is an SV that updating the user ID from time to time as the user desires. This SV is generated from an SV device and inputted into the local IAM module 102 when the user logs on to the user's computing device (such as mobile phone, PC, laptop, workstation, IoT controller, etc.). The SV will appear at the input of the DML 602 through 611.

At the same time, the user's old ID and old SV will also be input from the SV device into the Comparator 601 through 612. When the Comparator 601 receives the 612 input, it will send a signal into the DML 602 through 613 requesting to replace the old SV in the user ID. The DML 602 will search the old user ID in the memory 603 through 614. When the memory 603 locates the old user ID, it will output them through 615 into the Comparator 601. The Comparator 601 uses the signal coming from 615 compares with the signal coming from 612. If both signals are matched, the Comparator 601 sends a signal through 616 to inform the DML 602 to allow the replacement of the old SV with the new SV.

After the new SV is updated, the DML 602 sends the updated user ID to store in the IAM memory 603 through 617. The DML 602 also sends a copy of the updated user ID to the Hand Shaking with other IAM (Encryption) module 605 through 618. The output of the Hand Shaking with other IAM (Encryption) module 605, which is the newest user ID 619, will be propagated and updated to the remote IAM modules 600 according to the NM.

The input 622 of the hand-shaking with other IAM (Decryption) module 604 receives the updated user ID from the remote IAM module 600, or a new user ID from the local device, outputs it into the Memory 603 through 621. Both the decryption as well as the encryption hand-shaking with other IAM modules 604 605 need a key to decrypt or encrypt the updated user ID that is transferred between the IAM modules 600. This key is sent from the Top IAM Control module through 620.

FIG. 10 illustrates the SFS 900. It has the encrypted cipher text section 901, the TC section 902, the LP section 903, and the DL section 904.

What is claimed is:

1. A cyberspace security system where its digital file are always encrypted, both in static and in a mobile state, except during their plaintext processing period, using an ART-CRYPTO secure architectural system, the ART-CRYPTO secure architectural system comprising:

a user interface (UI), an identity and authorization management (IAM) module, a data base (DB) with a special file structure (SFS), a cipher engine (CE) module which comprises of a pseudo-random number generator (PNG) module, a clock speed controller module, an encryption/decryption (ED) module, an operating system with a special scheduler (OSS), an isolated random-access memory (IRAM) where its area is isolated from other users or programs when a plaintext file is being processed, and an application programming module (App) which contains multiple general-purpose processors, special-purpose processors (custom-designed processor and memory architecture according to a data computing algorithm and structure), and different kinds of accelerators;

the files in the invented ART-CRYPTO secure architectural system are divided into blocks, the number of blocks in a file is the file length and a block is 128 bits according to the Advanced Encryption Standards (AES);

each block of a file has its own encryption/decryption key, which is provided by the PNG module, and the keys in different blocks are not repeated;

the key stream of a file is generated and consumed within the CE module, wherein the CE module is an application specific integrated circuit (ASIC);

the key stream is consumed immediately right after its generation within the CE module where there is no key stream storage or management;

encrypted files in the DB are in a special file structure (SFS) format, which comprises an encrypted cipher text, a two codes (TC), a location map (LM), and a distribution list (DL);

encrypted file accessing authorization is determined by whether the user's attribute of the file exists in the DL and whether the user passes the user identification (ID) verification process, which occurs in the DB and the identity and authorization management (IAM) module;

wherein all files are encrypted/decrypted in the CE module;

wherein the CE module uses the TC to encrypt/decrypt files;

the plaintext of a file is processed parallelly using specially customized design multiple and different types of processors, with partitioned IRAM surrounding them, according to the data computing structure, where the data computing structure is analyzed and configured by the OSS according to different computational algorithms;

wherein the plaintext of a file is processed in an IRAM, which is assigned by the OSS.

2. The ART-CRYPTO secure architectural system of claim 1, wherein the ART-CRYPTO secure architectural system is embedded in all devices such as computing devices, smart phones, systems, sensors, Internet of Things (IoT) and network environments throughout the Internet.

3. The ART-CRYPTO secure architectural system of claim 1, wherein the plaintext, after being processed by the App module, will be encrypted together with the TC, the LM, the DL, and sent back to DB.

4. The ART-CRYPTO secure architectural system of claim 1, wherein the IRAM will be reset back to zero after the App module finishes processing a plaintext file and sends it back to the CE module.

5. The ART-CRYPTO secure architectural system of claim 1, wherein the IAM modules in every device form into a distributed IAM sub-system throughout the Internet;

the IAM module updates the user ID using a special variable (SV) device each time a user logs onto a computing device, wherein the SV device is a sensor which generates a random number and provides it to the user ID;

the IAM module disseminates the updated user ID throughout the Internet to every device wherever the IAM module in a device contains the user ID, and the device then updates the newest user ID in its IAM module;

the user ID, which is in the IAM module, synchronizes with the user's attribute of a file, which is in the DL, in real time;

the user ID in the IA module comprises user's biometrics, device hardware address, network domain name, routing addresses, geolocation information, and a SV;

the IAM module distributed sub-system has a central control unit, which is able to plug into any IAM module node and controls all the encrypted communication between IAM modules;

the IAM module automatically generates a Network Map (NM), which is composed of user's device's routing address, domain name, device hardware address and the user's login identity information when a user logs onto a computing device.

6. The ART-CRYPTO secure architectural system of claim 1, wherein the UI, the IAM module, the OSS, and the DB, which has a SFS format, including a DL, constructs an encrypted file accessing authorization architecture, and which also implements a user ID matching and verification process.

7. The ART-CRYPTO secure architectural system of claim 1, wherein the OSS module coordinates the UI, the IAM module, the DL in the DB, the CE module, the IRAM and the APP module, to execute the user ID verification process, the file encryption/decryption process, the analyzing of a file data computing structure, the designation of a IRAM, the designation of a computing resource which the computing resource is a heterogeneous multiprocessor system and is used for parallel processing, the plaintext processing, the resetting IRAM back to zero, and the storing of an encrypted file back to the DB.

8. The ART-CRYPTO secure architectural system of claim 1, wherein the IAM module is designed to store user ID, where the user ID can be updated, erased, but not retrievable.

9. The ART-CRYPTO secure architectural system of claim 1, wherein the IAM module has an Artificial Intelligence (AI) unit, which is designed to implement user's interactive biometric ID data verification while the user ID is not fully matched with the original stored user ID.

10. The ART-CRYPTO secure architectural system of claim 1, wherein the IAM module and the OSS module is having a point-to-point communication to handle user's ID verification process.

11. The ART-CRYPTO secure architectural system of claim 1, wherein the encrypted file will be removed, transferred, or self-destroyed from the DB of that device, or computing system, if the device's OSS module fails to receive a point-to-point responding signal from the IAM module after the OSS module requests the IAM module to do a user ID verification process for certain times.

12. The ART-CRYPTO secure architectural system of claim 1, wherein the user's attribute in the DL can only be modified by the owner of the encrypted file, his superior or the super user; and the user's attribute is updated and disseminated to the DL wherever the file is located, according to the LM once it is being modified.

13. The ART-CRYPTO secure architectural system of claim 1, wherein the LM contains all the file location information and is updated according to the file transfer, termination, and creation.

14. The ART-CRYPTO secure architectural system of claim 1, wherein the ED module comprises an ED scalable processor array, a random number buffer, a data input buffer, an automatic configuration unit, and a data output buffer;

the processors in the ED scalable processor array are the Fast Key-Changing Apparatus (FKCA) for AES cipher engine; and the automatic configuration unit configures the number of processors that are to be used in the ED processor array, according to the length of file, and makes the processor array scalable.

15. The ART-CRYPTO secure architectural system of claim 1, wherein the ED module uses the file length and the key stream to encrypt/decrypt a file.

16. The ART-CRYPTO secure architectural system of claim 1, wherein the PNG module comprises of two PNGs, both of which are hardware devices;

the first PNG generates a starting key automatically for the key stream without human intervention;

the second PNG generates the key stream using two numbers;

the first number which the second PNG uses is the random number that is generated by the first PNG, which is also the first number in the TC;

the second number which the second PNG uses is the length of the file, which is the second number in the TC; and the PNG module generates a key stream and is used immediately by the ED module, where the PNG module and the ED module are in the CE module, which is an ASIC.

17. The ART-CRYPTO secure architectural system of claim 1, wherein the PNG module has an enable input, which can be triggered by the OSS, or the owner of the file at any time when the owner of the file feels a need to re-encrypt the file.

18. The ART-CRYPTO secure architectural system of claim 1, wherein the clock speed controller module in the CE module adjusts the clock speed between the inputting data rate of the ED module, the inputting key stream rate of the ED module, and the processing speed of the ED processor array.

19. The ART-CRYPTO secure architectural system of claim 1, wherein the OSS module, after a plaintext is moved to the IRAM, analyzes the data computing structure, designates the heterogeneous computing resource, configures an IRAM area to surround the computing resource, and proceeds the parallel processing of the plaintext file; and the OSS module sends the plaintext file into the CE module for encryption after it is processed, and stores the file in the DB after the file is encrypted.

* * * * *